US 12,039,684 B2

United States Patent
Raschke et al.

(10) Patent No.: US 12,039,684 B2
(45) Date of Patent: Jul. 16, 2024

(54) METHOD AND SYSTEM FOR PREDICTING A COLLISION FREE POSTURE OF A KINEMATIC SYSTEM

(71) Applicant: Siemens Industry Software Ltd., Tel Aviv (IL)

(72) Inventors: Ulrich Raschke, Ann Arbor, MI (US); Ofer Ohayion, Kfar Saba (IL); Yizhar Alon, Binjamina-Giv'at Ada (IL); Rafael Blumenfeld, Raanana (IL)

(73) Assignee: Siemens Industry Software Ltd., Tel Aviv (IL)

( * ) Notice: Subject to any disclaimer, the term of this patent is extended or adjusted under 35 U.S.C. 154(b) by 64 days.

(21) Appl. No.: 17/741,680

(22) Filed: May 11, 2022

(65) Prior Publication Data

US 2022/0366660 A1    Nov. 17, 2022

(30) Foreign Application Priority Data

May 11, 2021   (EP) .................................... 21173306

(51) Int. Cl.
*G06T 19/20* (2011.01)
*G06T 7/50* (2017.01)
*G06T 7/70* (2017.01)

(52) U.S. Cl.
CPC ............... *G06T 19/20* (2013.01); *G06T 7/50* (2017.01); *G06T 7/70* (2017.01); *G06T 2207/20081* (2013.01); *G06T 2207/20084* (2013.01); *G06T 2210/21* (2013.01); *G06T 2219/2004* (2013.01)

(58) Field of Classification Search
CPC .................. G06T 2210/21; G05B 2219/40317
See application file for complete search history.

(56) References Cited

U.S. PATENT DOCUMENTS 11,135,720 B2 * 10/2021 Hazan ...................... B25J 13/06
2022/0230344 A1 * 7/2022 Singhal ................... G06T 7/174

OTHER PUBLICATIONS

Qureshi et al., Motion Planning Networks, 2019 International Conference on Robotics and Automation (ICRA), pp. 2118-2124 (Year: 2019).*

(Continued)

*Primary Examiner* — Samantha (Yuehan) Wang
(74) *Attorney, Agent, or Firm* — Laurence A. Greenberg; Werner H. Stemer; Ralph E. Locher

(57) ABSTRACT

A system and a method predict a collision free posture of a kinematic system. The method includes: receiving a 3D virtual environment, receiving a 3D representation of the kinematic system and a set of 3D postures defined for the 3D virtual kinematic system, receiving a target task to be performed by the kinematic system with respect to the surrounding environment, and receiving a prescribed location within the 3D virtual environment. The prescribed location defines a position at which the 3D virtual kinematic system has to be placed within the 3D virtual environment. A collision free detection function (CFD) is applied to a set of input data containing the 3D virtual environment, the target task, the prescribed location and the set of postures. The CFD function outputs a set of collision free postures enabling the kinematic system to perform the target task when located at the prescribed location.

15 Claims, 3 Drawing Sheets

300

(56) References Cited

OTHER PUBLICATIONS

Alok, Sharma et al.: "DeepInsight : A methodology to transform a non-image data to an image for convolutional neural network architecture"; Scientific Reports; vol. 9, Year: 2019, p. 11399, XP002804654.
Qureshi, H. Ahmed et al: "Motion Planning Networks"; 2019 International Conference on Robotics and Automation (ICRA), IEEE; May 20, 2019 (May 20, 2019), pp. 2118-2124, XP033593834.

* cited by examiner

METHOD AND SYSTEM FOR PREDICTING A COLLISION FREE POSTURE OF A KINEMATIC SYSTEM

CROSS-REFERENCE TO RELATED APPLICATION

This application claims the priority, under 35 U.S.C. § 119, of European Patent Application EP 21173306.8, filed May 11, 2021; the prior application is herewith incorporated by reference in its entirety.

FIELD AND BACKGROUND OF THE INVENTION

The present disclosure is directed, in general, to computer-aided design, visualization, and manufacturing ("CAD") systems, product lifecycle management ("PLM") systems, product data management ("PDM") systems, and similar systems, that manage data for products and other items (collectively, "Product Data Management" systems or PDM systems). More specifically, the disclosure is directed to production environment simulation.

Complex kinematic systems, such as robots, are widely used in industrial applications for performing automatic or semi-automatic robotic operations along a predefined or live calculated trajectory. Collisions between a complex kinematic system and its surrounding environment are to be avoided. This is particularly true when programming paths for complex kinematic systems like robots, or simulating task activities for complex kinematic systems like humans in three dimensional (3D) environments. Typical simulation scenarios may include a virtual assessment of reach, clearance or performance capability associated with a product or a workplace interaction. The goal is to create realistic and collision free animation of expected kinematic model interaction within a surrounding environment such that accurate assessments of the proposed design can be performed.

For instance, human performance models require accurate representation of postures and movements for accurate injury risk predictions. The fidelity of the simulated postures is thus very important. In particular, one challenge surrounds the definition of postures in a presence of obstacles. A person may need to stoop under, reach over, or otherwise modify their neutral posture to avoid collision with the surrounding environment. This is a challenging problem to solve in simulation. In particular, contemporary human figures have more than 70 joints, and many factors need to be taken into account to represent realistic postures, including balance, physiological range of motion constraints on the joints, strength capability and more. While possible to employ methods such as Rapidly Exploring Random Trees (RRT) to solve such problem, the current techniques require significant time to execute. Beyond the computation time to search for a solution, the currently known techniques rely on rapidly performing collision detection to the geometry in the scene, which often requires time-consuming preparatory voxelization of the surrounding environment.

Various methods have been used for providing collision free posturing. These methods include, for instance, a manual adjustment of individual joints in a kinematic chain, a use of inverse kinematics to ease/speed the manual chain posturing, optimization techniques that include constraint surfaces representing collision boundaries, frameworks of analytical empirical behavior models, a use of path planning technology, such as RRT to find a collision free posture, and others. Unfortunately, these known methods incur considerable manual interaction time cost or computational solution cost. For instance, performing a manual correction for such collisions in a simulation is a time intensive activity requiring a manipulation of many joints and degrees of freedom. This time burden restricts the value of human simulation technology—it is simply too expensive to simulate all tasks of interest.

Therefore, improved techniques for collision free posturing are desirable.

SUMMARY OF THE INVENTION

The present invention proposes to calculate collision free postures during simulation for complex kinematic systems, like robots or humans. Various disclosed embodiments include methods, systems, and computer readable mediums for predicting a kinematic system posture that is free of collision with its surrounding environment.

A method includes receiving a 3D virtual environment that is a 3D representation of the surrounding environment. The method further contains receiving a 3D virtual kinematic system that is a 3D representation of the kinematic system and receiving a set of 3D postures predefined for the 3D virtual kinematic system. The method contains defining or receiving a target task to be performed by the kinematic system, and defining or receiving a prescribed location within the 3D virtual environment, the prescribed location defining a position at which the 3D virtual kinematic system has to be placed within the 3D virtual environment in order to create a 3D system comprising the 3D virtual environment and the 3D virtual kinematic system placed at the prescribed location. The method then includes applying a collision free detection function—hereafter CFD function—trained by a machine learning algorithm to a set of input data containing the 3D virtual environment, the prescribed location, the set of postures, and the target task, and is configured for generating, for the 3D virtual kinematic system, a set of output data that is a subset of the set of 3D postures containing all 3D postures of the set of 3D postures that enable the kinematic system to perform the target task from the prescribed location free of collision with the surrounding environment. The method includes then selecting at least one collision free posture from the set of output data and displaying the selected collision free posture of the 3D virtual kinematic system within the 3D virtual environment.

A data processing system containing a processor and an accessible memory or database is also disclosed, wherein the data processing system is configured to implement the previously described method.

The present invention proposes also a non-transitory computer-readable medium encoded with executable instructions that, when executed, cause one or more data processing systems to perform the previously described method.

An example of computer-implemented method for creating a training dataset for training a CFD function is described. This computer-implemented method includes:

a) receiving a set of 3D virtual environments and for each 3D virtual environment, a prescribed location defined within the 3D virtual environment;

b) receiving a 3D virtual kinematic system and a set of postures, typically 3D postures, defined for the 3D virtual kinematic system;

c) receiving, for each 3D virtual environments, a target task to be performed when the 3D virtual kinematic system is located at the prescribed location;

d) automatically selecting one of the 3D virtual environments and automatically performing the following steps for the selected 3D virtual environment:
d1) automatically selecting a posture within the set of postures;
d2) automatically performing the following steps for the selected posture:
i) creating a set of data containing an identification of the 3D virtual environment that has been selected, an identification of the prescribed location, an identification of the target task, and an identification of the posture that has been selected;
ii) placing the 3D virtual kinematic system characterized by the selected posture at the prescribed location defined within the selected 3D virtual environment to create a 3D system containing the 3D virtual environment and the 3D virtual kinematic system placed at the prescribed location. Placing means in particular to position the 3D virtual kinematic system in the same reference frame as the 3D virtual environment;
iii) determining whether the 3D virtual kinematic system characterized by the selected posture is able to perform the target task when placed at the prescribed location, and if yes, proceeding with the next step iv), otherwise, labelling the created set of data with a label characterized by a first value, storing in a database the label associated or assigned to the set of data, then selecting another posture of the set of postures that has not yet been selected if any, and repeating step d2) for the newly selected posture if such a posture exists, otherwise proceeds to step e);

iv) determining whether a collision between the 3D virtual kinematic system characterized by the selected posture and the 3D virtual environment occurs, and if a collision occurs, then labelling the set of data with the label characterized by the first value, otherwise, i.e. if no collision occurs, labelling the set of data with the label characterized by a second value;

vi) storing, in the database, the label assigned to the set of data;

vii) selecting another posture of the set of postures that has not yet been selected if any, and repeating step d2) for the newly selected posture, otherwise, proceeding to step e);

e) repeating step d) for all 3D virtual environments of the set of 3D virtual environments in order to create a training dataset containing:

as training input data: the 3D virtual environments and their respective prescribed location and target task, the set of postures, optionally, the 3D virtual kinematic system; and as training output data: a set of labels, wherein each label is characterized by either the second value or the first value, and wherein each label is associated or assigned to a set of data containing an identification of the 3D virtual environment, of the prescribed location, of the target task, and of the posture for which the label value has been assigned.

An example of computer-implemented method for providing a trained CFD function is also proposed by the present invention. This computer-implemented method includes:

a) receiving a training dataset with a first interface, wherein the training dataset contains training input data and training output data, wherein the training input data includes:

a set of 3D virtual environments, and for each 3D virtual environment of the set, a prescribed location and a target task, a set of 3D postures defined for the 3D virtual kinematic system, and optionally the 3D virtual kinematic system itself, and wherein the training output data includes:

a set of labels, wherein each label is characterized by either a second value or a first value, and wherein each label is associated or assigned to a set of data containing an identification of the 3D virtual environment, of the prescribed location, of the target task, and of the posture for which the label value has been assigned;

b) automatically selecting one of the 3D virtual environments and automatically performing the following steps for the selected 3D virtual environment:

b1) acquiring at least one depth image of the 3D virtual environment from the prescribed location;

b2) for each of the acquired depth image, using the depth image, the target task, and the prescribed location as inputs to a dimensionality reduction algorithm configured for providing as output a 2D image;

b3) for each of the obtained 2D images, repeating the following steps (i) and (ii) for training a convolutional neural network, hereafter CNN, of the CFD function until each posture of the set of 3D postures has been selected once according to step i):

i) automatically selecting a posture within the set of postures that has not yet been selected;

ii) training the CNN, wherein the 2D image and the selected posture, preferentially an ID of the selected posture, are used as input training data for the CNN and the label value associated to the set of data containing an identification of the 3D virtual environment that has been selected, of the prescribed location, of the target task, and of the posture that has been selected is used as output training data. The CNN receives thus for its training the input training data and the output training data. Given a set of postures for a kinematic system, the training of the CNN will enable the latter to automatically associate a subset of the postures to a 2D image encoding the 3D virtual environment, prescribed location and target task, wherein the subset of postures contains all postures of the given set that enable the kinematic system to perform the target task from the prescribed location within the 3D virtual environment;

c) repeating step b) until all 3D virtual environments of the set of 3D virtual environments have been processed, i.e. have been once selected; and d) providing the trained CFD function with a second interface. The second interface might be the same as the first interface.

The foregoing has outlined rather broadly the features and technical advantages of the present disclosure so that those skilled in the art may better understand the detailed description that follows. Additional features and advantages of the disclosure will be described hereinafter that form the subject of the claims. Those skilled in the art will appreciate that they may readily use the conception and the specific embodiment disclosed as a basis for modifying or designing other structures for carrying out the same purposes of the present disclosure. Those skilled in the art will also realize that such equivalent constructions do not depart from the spirit and scope of the disclosure in its broadest form.

Before undertaking the DETAILED DESCRIPTION below, it may be advantageous to set forth definitions of certain words or phrases used throughout this patent document: the terms "include" and "comprise", as well as derivatives thereof, mean inclusion without limitation; the term "or" is inclusive, meaning and/or; the phrases "associated with" and "associated therewith", as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, whether such a device is implemented in hardware, firmware, software or some combination of at least two of the same. It should be noted that the functionality associated with any particular controller may be centralized or distributed, whether locally or remotely. Definitions for certain words and phrases are provided throughout this patent document, and those of ordinary skill in the art will understand that such definitions apply in many, if not most, instances to prior as well as future uses of such defined words and phrases. While some terms may include a wide variety of embodiments, the appended claims may expressly limit these terms to specific embodiments.

Other features which are considered as characteristic for the invention are set forth in the appended claims.

Although the invention is illustrated and described herein as embodied in a method and a system for predicting a collision free posture of a kinematic system, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

FIGS. 1 through 4, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged device. The numerous innovative teachings of the present application will be described with reference to exemplary non-limiting embodiments.

Previous techniques for a collision free posturing for a kinematic system have some drawbacks. The embodiments disclosed herein provide numerous technical benefits, including but not limited to the following examples. In particular, the present invention proposes to use Artificial Intelligence (AI) to determine a posture that is highly likely to be collision free given a figure size, a figure task (reach) requirement and geometry topography. Thanks to the new concept according to the invention, a rapid collision free posture prediction can be performed in cluttered environments for complex kinematic systems, such as humans and robots.

While the presented embodiments will focus on humanoid modeling, the proposed method can be used also to solve any analogous problems for any complex kinematic system, including robots.

Figure 1:
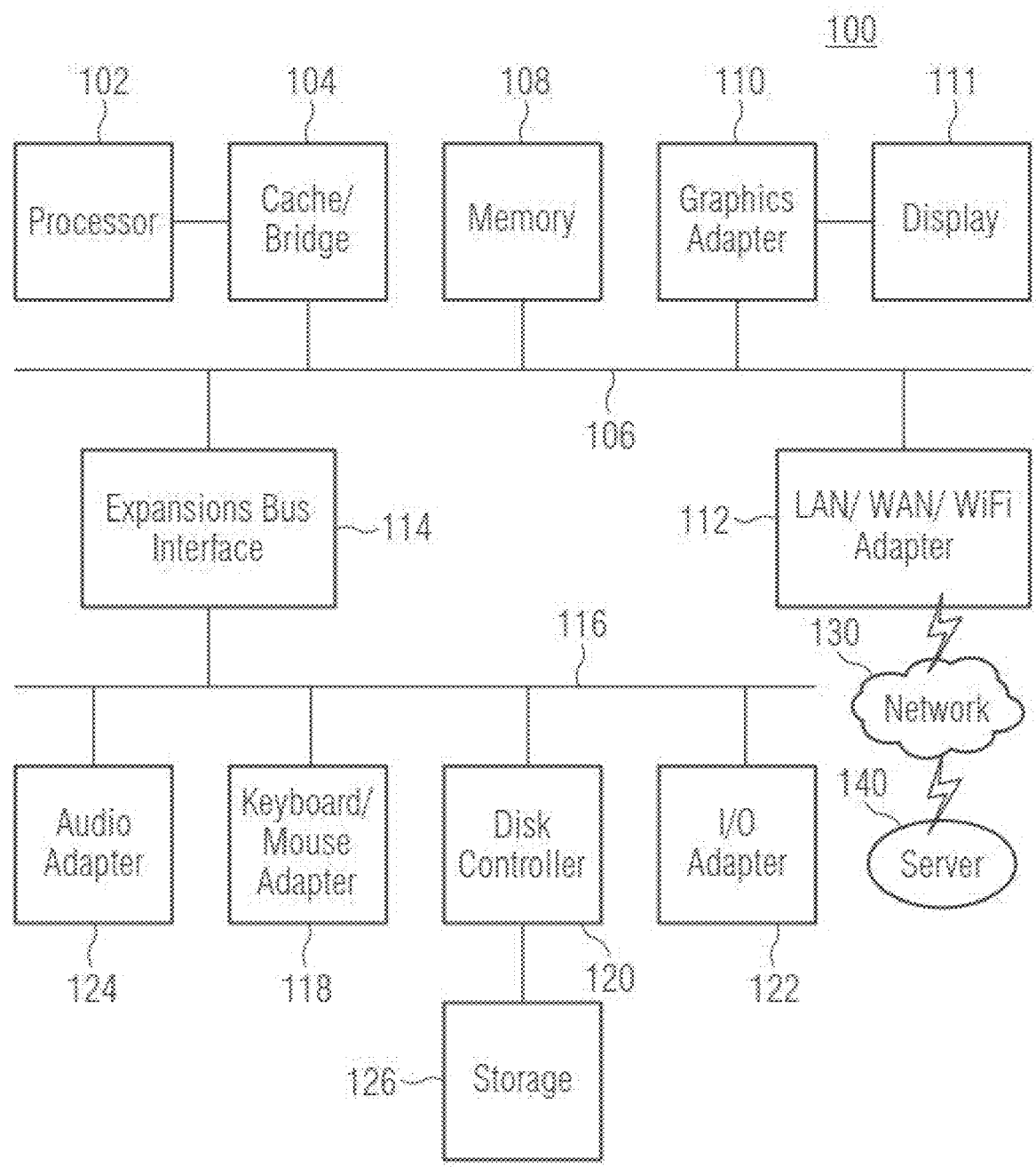
FIG. 1 is a block diagram showing a data processing system in which an embodiment can be implemented.

Referring now to the figures of the drawings in detail and first, particularly to FIG. 1 thereof, there is shown a block diagram of a data processing system 100 in which an embodiment can be implemented, for example as a PDM system particularly configured by software or otherwise to perform the processes as described herein, and in particular as each one of a plurality of interconnected and communicating systems as described herein. The data processing system 100 illustrated can include a processor 102 connected to a level two cache/bridge 104, which is connected in turn to a local system bus 106. Local system bus 106 may be, for example, a peripheral component interconnect (PCI) architecture bus. Also connected to local system bus in the illustrated example are a main memory 108 and a graphics adapter 110. The graphics adapter 110 may be connected to display 111.

Other peripherals, such as local area network (LAN)/Wide Area Network/Wireless (e.g. WiFi) adapter 112, may also be connected to local system bus 106. An expansion bus interface 114 connects local system bus 106 to input/output (I/O) bus 116. I/O bus 116 is connected to keyboard/mouse adapter 118, disk controller 120, and I/O adapter 122. The disk controller 120 can be connected to a storage 126, which can be any suitable machine usable or machine readable storage medium, including but are not limited to nonvolatile, hard-coded type mediums such as read only memories (ROMs) or erasable, electrically programmable read only memories (EEPROMs), magnetic tape storage, and user-recordable type mediums such as floppy disks, hard disk drives and compact disk read only memories (CD-ROMs) or digital versatile disks (DVDs), and other known optical, electrical, or magnetic storage devices.

Also connected to I/O bus 116 in the example shown is audio adapter 124, to which speakers (not shown) may be connected for playing sounds. Keyboard/mouse adapter 118 provides a connection for a pointing device (not shown), such as a mouse, trackball, trackpointer, touchscreen, etc.

Those of ordinary skill in the art will appreciate that the hardware illustrated in FIG. 1 may vary for particular implementations. For example, other peripheral devices, such as an optical disk drive and the like, also may be used in addition or in place of the hardware illustrated. The illustrated example is provided for the purpose of explanation only and is not meant to imply architectural limitations with respect to the present disclosure.

A data processing system in accordance with an embodiment of the present disclosure can include an operating system employing a graphical user interface. The operating system permits multiple display windows to be presented in the graphical user interface simultaneously, with each display window providing an interface to a different application or to a different instance of the same application. A cursor in the graphical user interface may be manipulated by a user through the pointing device. The position of the cursor may be changed and/or an event, such as clicking a mouse button, generated to actuate a desired response.

One of various commercial operating systems, such as a version of Microsoft Windows™, a product of Microsoft Corporation located in Redmond, Washington may be employed if suitably modified. The operating system is modified or created in accordance with the present disclosure as described.

LAN/WAN/Wireless adapter 112 can be connected to a network 130 (not a part of data processing system 100), which can be any public or private data processing system network or combination of networks, as known to those of skill in the art, including the Internet. Data processing system 100 can communicate over network 130 with server system 140, which is also not part of data processing system 100, but can be implemented, for example, as a separate data processing system 100.

As used herein, the term kinematic system refers to any real system characterized by a motion in a surrounding environment and whose posture in function of the time has to be determined. It can be a robot, like an industrial robot, or any other type of kinematic machine, or a biological object, like a human. The present invention is interested in determining which posture of the kinematic system at a given time is free of collision with its surrounding environment. The surrounding environment at the given time is a known parameter and the free of collision posture has thus to be determined. The surrounding environment is a real environment, like a workstation, a clean room, etc., that is modelled in 3D for creating the 3D virtual environment.

Figure 2:
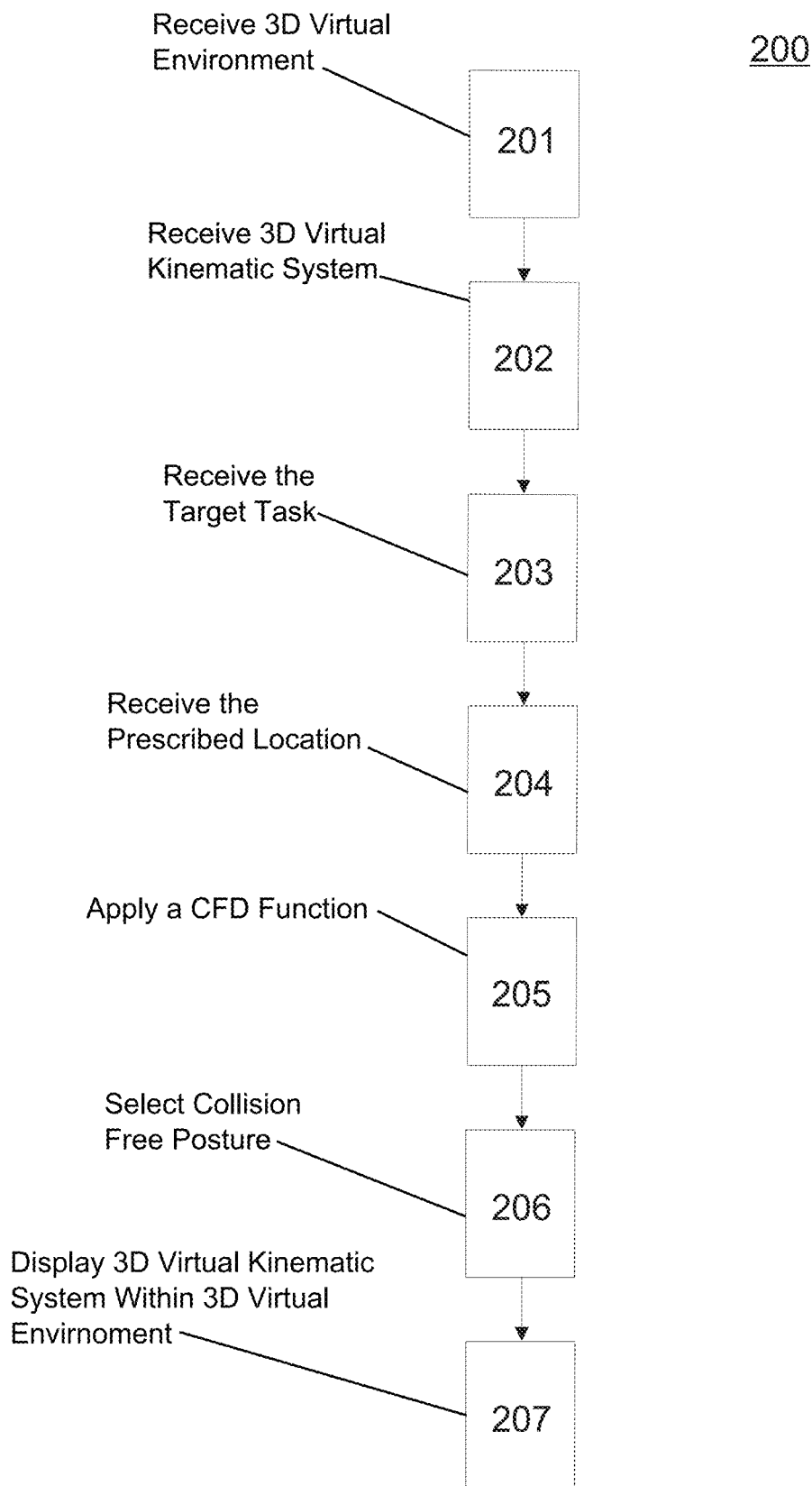
FIG. 2 is a flowchart for predicting a motion trajectory of a robot in accordance with disclosed embodiments.

For this purpose, the present invention proposes to transform the kinematic problem of finding a collision free posture to an image classification problem, suitable for solution using known in the art image classification techniques. FIG. 2 illustrates a flowchart 200 of a method for predicting a collision free posture for a kinematic system. Such method can be performed, for example, by system 100 of FIG. 1 described above, but the "system" in the process below can be any apparatus configured to perform a process as described. The method according to the invention will be now described in more details in connection with FIG. 2.

Figure 4:
FIG. 4 is an illustration showing an example of workstation depth image.

At step 201, the system 100 according to the invention receives a 3D virtual environment, i.e. a 3D representation of a surrounding environment. Such surrounding environment might be a workstation as shown in FIG. 4. Typically, a target task needs to be performed by a kinematic system, for instance, an operator or a robot, at the workstation, and a posture free of any collision with any element of the surrounding environment, e.g. workstation, needs to be determined for this operator or robot.

At step 202, the system 100 receives a 3D virtual kinematic system, i.e. a 3D representation of the kinematic system, as well as a set of postures defined for the 3D virtual kinematic system. Each posture of the set of postures represents a realistic posture for the kinematic system, taking for instance into account each degree of freedom of each joint of the kinematic system. Each posture might be identified with an ID configured for enabling the system 100 to easily identify or retrieve the posture.

At step 203, the system 100 receives a target task to be performed by the 3D virtual kinematic system with respect to the 3D virtual environment. This target task represents thus, in the virtual world, a target task that the kinematic system has to perform with respect to the surrounding environment in the real world. The target task is preferentially a task defined by a user for the kinematic system with respect to the surrounding environment and defining thus also a task to be implemented in the 3D representations of the latter.

At step 204, the system 100 receives also a prescribed location (also called prescribed position) defined within the 3D virtual environment. The prescribed location defines or is a position of the kinematic system in its surrounding environment and with respect to the latter. In other words, the prescribed location enables the system to position the 3D virtual kinematic system in the 3D virtual environment, since it defines the position of the kinematic system, for instance of a reference point of the kinematic system, in the surrounding environment. In particular, the prescribed location defines the position and the orientation of the 3D virtual kinematic system with respect to the 3D virtual environment so that it mimics a realistic behavior of the real kinematic system within its surrounding environment. Typically, the prescribed location is configured for defining the position and orientation of a reference frame of 3D virtual kinematic system with respect to a reference frame of the 3D virtual environment. Both the 3D virtual kinematic system and 3D virtual environment can then be modelled in a same reference frame, wherein the reference point enables to position the 3D virtual kinematic system in the reference frame with respect to the 3D virtual environment.

Steps 201 to 204 can take place simultaneously, successively, or can be performed in any other order. The goal of steps 201 and 202 is to provide to the system 100 according to the invention information about, on one hand, the surrounding environment wherein the target task has to be performed, and, on the other hand, the kinematic system that has to perform the target task. The goal of steps 203 and 204 is to provide to the system 100 information about the target task to be performed and from which position the kinematic system shall perform the target task. In particular, the target task might be configured for defining an action to be performed by the kinematic system, wherein the action depends on the surrounding environment. The action might require a physical interaction with the surrounding environment, the target task defining for instance at least one target position within the surrounding environment to be reached by at least one part of the kinematic system (e.g. by an extremity of an arm of a human or robot), or a non-physical interaction with the surrounding environment, like a contactless measurement to be performed by the kinematic system on an element of the surrounding environment, or an image acquisition of an object of the surrounding environment and to be performed by a camera of the kinematic system, etc. For instance, the target task defines a position or surface or volume or element within the surrounding environment, and thus within the 3D virtual environment, to be reached by a part of the kinematic system, or more generally, with respect to which the kinematic system has to interact or perform an action, when located at the prescribed location.

The set of postures according to the invention can be generated on the fly by the system 100, for instance from the geometrical configuration of the 3D virtual kinematic system taking into account the degree(s) of freedom of each moving part or joint of the 3D virtual kinematic system. The set of postures might also be received or loaded from a database by the system 100 according to the invention. For instance, the system 100 might be configured for using a library of postures that might be stored in the database or memory 108 of the system 100 according to the invention. The library might be configured for containing several 3D virtual kinematic systems, and for each of them, a set of postures defined specifically for the considered 3D virtual kinematic system. For instance, once the kinematic system for which a collision free posture has to be found is entered into the system 100 according to the invention, then the latter might be configured for automatically downloading or acquiring the 3D virtual kinematic system and the corresponding set of postures from the database. The correct set of postures (i.e. the set of postures corresponding to the kinematic system entered into the system 100 according to the invention) might be thus received or loaded using the library, but it can also be automatically generated by the system according to the invention. For instance, it can automatically divide the 3D virtual kinematic system in n subsystems using division criteria based for instance on the presence of joints in the kinematic system. For each of the subsystems, the data processing system 100 is configured for automatically determining, by modelling for instance the dynamic of mechanical joints, a finite set of subsystem postures. Then the set of postures is obtained by determining all possible combinations of the subsystem postures. For this purpose, a configuration table as shown in FIG. 3 might be used or implemented by the system according to the invention.

Figure 3:
FIG. 3 is an illustration of a configuration table in accordance with disclosed embodiments.

FIG. 3 shows a configuration table that might be used or implemented by the system 100 according to the invention for determining all possible combinations of subsystem postures in order to create the set of postures. The subsystem postures are preferentially 3D postures. The example of a kinematic system being a human is taken for illustration purpose in FIG. 3. The kinematic system, i.e. the human body, is divided in 4 subsystems, namely the torso 301, the left arm 302, the right arm 303, and the legs 304. For each subsystem, a finite set of subsystem postures is defined and for instance stored in the database or automatically generated by the system 100 according to the invention. Each line of the configuration table provides a different combination of a torso posture, left arm posture, right arm posture and leg posture, resulting in a whole-body posture defined by the combination of the subsystem postures, and associating an ID 305 to the resulting whole body posture. In other words, the present invention proposes to break the 3D virtual kinematic system into n subsystems, to define for each of the subsystems a finite set of 3D subsystem postures, wherein each posture of the set of postures defined for the 3D virtual kinematic system is obtained by combining 3D subsystem postures, so that each combination of 3D subsystems postures results in a different 3D virtual kinematic system posture (i.e. "whole" system posture), which can be identified using the ID. Other ID might be used respectively for enabling an identification of the 3D virtual environment, prescribed location, target task. For instance, each 3D virtual environment might be associated to an ID, each prescribed location to another ID, and each target task to yet another ID.

The 3D virtual environment together with the 3D virtual kinematic system positioned at the prescribed location (i.e. represented in the same reference frame as the 3D virtual environment) form a 3D system. The present invention enables to predict the postures of the 3D virtual kinematic system for which a collision with the 3D virtual environment might occur.

At step 205, and for this purpose, the CFD function is applied to a set of input data containing the 3D virtual environment, the target task, the prescribed location and the set of postures. More precisely, the CFD function receives the 3D virtual environment, the prescribed location, the target task, the set of postures, and optionally the 3D virtual kinematic system, as inputs and provides as output a set of collision free postures enabling the 3D virtual kinematic system to perform the target task when located at the prescribed location, and enabling thus the "real" kinematic system to perform the target task when located at the prescribed location in the "real" surrounding environment. In particular, the collision free postures are ordered in the set of collision free postures according to their likelihood to be collision free with the surrounding environment, from the most likely to the least likely. Among the obtained collision free postures, the system then might automatically select the most appropriate, for instance the posture that is the most likely collision free, for controlling the kinematic system, for instance, for controlling a real robot that has to perform the target task.

The CFD function according to the invention is a function trained by machine learning. It has been trained specifically for the kinematic system. This CFD function is configured for transforming the kinematic problem of collision free postures related to the 3D system into an image classification problem. Preferentially, the machine learning algorithm used for training the CFD function uses a CNN. In particular, the CFD function is configured for automatically acquiring one or several depth images of the 3D virtual environment. Each depth image provides information about the topography of the surrounding environment. FIG. 4 shows on the left a surrounding environment that is a workstation 401 and provides on the right an example of a depth image 402 of the workstation 401. According to the present invention, each depth image is acquired from the prescribed location acting as a viewpoint, i.e. as if an imaging system configured for acquiring the depth images was located at the prescribed location. Each depth image provides thus a depth map of the 3D virtual environment surrounding the prescribed location, and therefore information, i.e. depth data, relating to the distance separating the prescribed location from the surface of objects of the 3D virtual environment. The depth images might be taken along different acquisition directions from the prescribed location so that for instance depth data for the whole environment surrounding the prescribed location be acquired. In particular, the CFD function is configured for automatically creating a set of depth images for the 3D virtual environment, wherein each depth image of the set has been acquired from the prescribed location but according to a different acquisition direction, i.e. so that each depth image represents a different portion of the 3D virtual environment, as viewed. Preferentially and optionally, a top view image from an image acquisition position located above the prescribed location might be acquired in order to capture bin depths. Preferentially, the depth image data are normalized to a stature or size of the 3D virtual kinematic system.

Each depth image according to the invention represents multiple 3D data sets (u, v, z), with u, v being the coordinates of a bin in the depth image, and z depth information. Also, each 3D virtual kinematic system posture is defined by a set of 3D joint data (e.g. more than 50 joints for a human body), containing a high dimensional data space, i.e. more than 2 or 3 dimensions. The CFD function is configured for automatically converting the depth image, i.e. the depth image data, the prescribed location, e.g. a 3D position defined within the 3D virtual environment, and the target task, e.g. another 3D position defined within the 3D virtual environment, into a well-organized image form, i.e. a matrix M of size m×n, that is a 2D image encoding the depth image, target task, and prescribed location. For this purpose, the CFD function uses a dimensionality reduction algorithm. The dimensionality reduction algorithm is configured for organizing the multi-dimensional data coming from the depth image, prescribed location, and target task into a 2D matrix (image) convenient for CNN technique. Preferentially, the DeepInsight method described by Alok Sharma et al. ("DeepInsight: A methodology to Transform a Non-Image Data to an Image for Convolutional Neural Network Architecture", Scientific Reports 9, 11399 (2019)) is used by the CFD function for creating the 2D image, the DeepInsight method enabling to output, for each depth image, prescribed location, and target task, received as input, a 2D image encoding information comprised within the received inputs (depth image, prescribed location, and target task). Of course, any other dimensionality reduction algorithm capable of transforming 3D image data, i.e. multiple sets of multi-dimensional data, into a 2D plane or matrix, i.e. into an organized 2D image form, suitable for being used in a machine learning algorithm using CNN might be used by the CFD function. Preferentially, the dimensionality reduction algorithm might be configured for additionally using the bin depth information for the creation of the 2D image.

For each of the acquired depth images, the dimensionality reduction algorithm outputs a 2D image. The obtained 2D images are then used by the CFD function as input to a CNN. The latter is configured for automatically determining from a received 2D image a set of collision free postures containing each posture of the set of postures that enables the kinematic system to perform the target task from the prescribed location. Preferentially, after receiving as input the 2D image, the CNN automatically outputs a list containing the ID, i.e. an identification, of each posture of the received set of postures that is a free of collision posture enabling the kinematic system to perform the target task from the prescribed location. The set of collision free postures is thus automatically created by the CFD function. Preferentially, if there are several depth images and thus several 2D images, then the CFD function will output several of the sets of output data that are sets of collision free postures (basically, for each 2D image, one set of collision free postures is created). In this case, in order to determine which postures are at the end free of collision postures, the CFD function is configured for determining a "final" set of output data that is the intersection of the obtained sets of output data, i.e. it contains all postures that belong at the same time to all sets of output data that have been generated by the CFD function when considering the several 2D images. A posture is thus considered by the system as collision free if it is comprised in each of the outputted sets of collision free postures that are created from the 2D images received as inputs. If it happens that a posture belongs to a set of collision free postures when using as input a first 2D image, and does not belong to another outputted set of collision free postures outputted when using as input a second 2D image, then, the posture is automatically rejected by the system from the "final" set of collision free postures.

At step 206, the data processing system 100 automatically selects at least one collision free posture from the obtained set of collision free postures. For instance, the system might be configured for automatically classifying the collision free postures of the set according to at least one predefined criterion, the latter being for instance an ergonomic criterion, or a performance criterion, or a speed criterion, or an energy consumption criterion, or a combination of different criterions, etc.

At step 207, the system 100 is configured for displaying the 3D virtual kinematic system within the 3D virtual environment, wherein the posture of the displayed 3D virtual kinematic system is the selected collision free posture. The display 111 of the system might be used for this purpose. The system 100 might then automatically determine a collision free motion of the kinematic system from the selected collision free posture and then might control the kinematic system according to the determined collision free motion, enabling thus to ensure a safe motion of the kinematic system within its surrounding environment.

In order to train the CFD function, the present invention proposes to automatically creates a training dataset. For this purpose, the data processing system 100 according to the invention might be further configured for receiving a set of 3D virtual environments and a set of 3D postures defined for the 3D virtual kinematic system, optionally the 3D virtual kinematic system itself. For each 3D virtual environment of the set, one or several prescribed locations might be defined, and for each prescribed location, one or several target tasks to be performed from the prescribed locations are defined. All this information is used as input for creating the training dataset.

The system 100 implements then the following steps in order to create the training dataset:

A) it automatically selects one of the 3D virtual environments, and, for this selected 3D virtual environment, automatically performs the following steps for a prescribed location of the 3D virtual environment and a target task to be performed from this prescribed location:

A1) it automatically selects a posture within the set of postures defined for the 3D kinematic system and then, A2) it automatically performs the following steps for the selected posture:

A21) it creates a set of data containing an identification of the 3D virtual environment that has been selected, an identification of the prescribed location, an identification of the target task, and an identification of the posture that has been selected. The set of data might comprise for instance the different IDs respectively associated to the 3D virtual environment, prescribed location, target task, and posture;

A22) it places the 3D virtual kinematic system characterized by the selected posture at the prescribed location defined within the selected 3D virtual environment to create a 3D system containing the 3D virtual environment and the 3D virtual kinematic system placed at the prescribed location. "Placing" means representing the 3D virtual kinematic system and the 3D virtual environment in a same frame of reference, wherein the position and orientation of the 3D virtual kinematic system with respect to the 3D virtual environment is determined for information comprised in the prescribed location. Optionally, the 3D virtual kinematic system or the 3D virtual environment can be normalized for keeping predefined proportionalities between the kinematic system and the surrounding environment;

A23) it determines whether the 3D virtual kinematic system characterized by the selected posture is able to perform the target task when placed at the prescribed location, and if yes, it proceeds with the next step A24), otherwise it automatically labels the created set of data with a label characterized by a first value, and stores the label associated to the set of data in a database, the label being configured for associating the first value to the set of data, then the system selects another posture of the set of postures that has not yet been selected if any, and repeats step A2) for the newly selected posture if such a posture exists, otherwise if it does not exist, i.e. if all postures have already been selected once, then it automatically proceeds to step B);

A24) it determines whether a collision between the 3D virtual kinematic system characterized by the selected posture and the 3D virtual environment occurs. For this purpose, the system 100 might use known in the art collision detection engines. Such collision engine typically uses collision detection algorithm operating on 3D objects;

A25) it labels the created set of data with the label, wherein the label is characterized by the first value if a collision occurs and with a second value if there is no collision. In other words, a label value is associated to each set of data containing an identification of the selected 3D virtual environment, of the prescribed location, of the target task, and of the posture. The label value is thus assigned to a specific combination of elements, which are a 3D virtual environment, a posture of the 3D virtual kinematic system within the 3D virtual environment, a prescribed location for the 3D virtual kinematic system, and a target task to be achieved within the 3D virtual environment from the prescribed location;

A26) it stores the label associated to the created set of data in a database, i.e. the label value associated to the set of data containing the identification of the 3D virtual environment that has been selected, the identification of the prescribed location and the target task within the 3D virtual environment, and the identification of the posture selected to realize the target task from the prescribed location. In other words, each posture, or posture ID, might be associated to multiple label values depending on which set of data it belongs to. Indeed, each label value is defined for a "specific" target task to be performed from a "specific" prescribed location in a "specific" 3D virtual environment. For instance, if several target tasks and several prescribed locations are defined for a same 3D virtual environment, then different label values might be assigned to the posture in function of the chosen prescribed location and target task;

A27) it selects another posture of the set of postures that has not yet been selected if any, and repeats step A2) for the newly selected posture, otherwise, if all postures have already been selected once, it automatically proceeds to step B). In other words, for a selected 3D virtual environment, prescribed location and target task according to step A), postures are successively selected and their potential collision with the surrounding environment determined or tested until all postures of the set have been tested with respect to the selected 3D virtual environment, prescribed location and target task;

B) it repeats step A1 and A2 for all other target tasks to be performed from the prescribed location if any, and once achieved, for all other prescribed locations and target task(s) to be performed from the considered prescribed location for the selected 3D virtual environment, and once achieved, it repeats step A for another 3D virtual environment until all 3D virtual environments of the set have been processed, enabling thus to create a training dataset containing:

as training input data: the 3D virtual environments and their respective prescribed location(s) and target task (s), the set of 3D postures, and optionally the 3D virtual kinematic system; and as training output data: a set of labels, wherein each label is characterized by either the first value or the second value, and wherein each label is associated or assigned to a set of data containing an identification of the 3D virtual environment, of the prescribed location, of the target task, and of the posture for which the label value has been assigned. In other words, the training output associates to each combination of a 3D virtual environment, prescribed location within the 3D virtual environment, target task to be performed from the prescribed location, and posture of the 3D virtual kinematic system for performing the target task from the prescribed location, a label value, namely a first label value if there is collision and a second label value if there is no collision.

The obtained training dataset might be then used for training the CFD function so that the trained CFD function might be used for the kinematic system with respect to any surrounding environment, and for any prescribed location and target task to be performed from the prescribed location. For instance, the training dataset might be received with a first interface of the system according to the invention. The CFD function is then trained by using as input the training input data and as output the training output data. From the training input data, the system 100 first acquires, for each 3D virtual environment, one or several depth images, wherein the latter are acquired from each prescribed location of the 3D virtual environment. Preferentially, the depth image data of each of the acquired depth images are normalized to the 3D virtual kinematic system stature or size to create a normalized depth image, making thus the learning insensitive to the dimensions of a specific kinematic system, and therefore so that the CFD function works with any kinematic system characterized by a similar or identical shape, while the size might differ. The normalized depth image(s) might then be used in the next steps instead of the "originally acquired" depth image. Then, for each of the acquired depth image, the system 100 uses the acquired depth image, the target task, and the prescribed location as inputs to a dimensionality reduction algorithm, e.g. DeepInsight algorithm, configured for providing as output a 2D image that encodes the received inputs. Then the system 100 uses all created 2D images and all postures as input to the CNN of the CFD function, wherein, for each 2D image, the system iteratively selects a posture of the set of postures until all postures have been selected once with the 2D image, and uses the selected posture or an identification of the latter, like its ID, and the 2D image as training input data for the CNN, wherein the label value associated to the set of data containing the identification of the 3D virtual environment, prescribed location, and target task encoded in the 2D image, and of the posture that has been selected is used as output training data for the training of the CNN. At the end of the training, the trained CFD function might be provided with a second interface, and preferentially stored in a memory or database of the system 100 according to the invention.

After the training, an end-user might simply place the kinematic system, like a robot or virtual human, at a prescribed location in front of a new surrounding environment, like a workstation, define a target task for the robot or virtual human, and then launch the trained CFD function for identifying which postures are the most likely to be collision free. Advantageously, the trained CFD function will work with any morphologically similar kinematic system, independently of the size of the kinematic system as long as the depth images are normalized to the kinematic system size. Then, among the most likely free of collision postures, the system 100 may automatically determine which one is the most suitable, for instance in function of lowest effort, and/or greatest comfort, and/or other performance metrics. The kinematic system with the most suitable posture is then applied.

Thanks to the present invention, the multi-dimensional posture prediction problem for the 3D virtual kinematic system might be transformed into a classification problem enabling for instance a CNN technique to identify collision free postures. The use of depth images to acquire 3D geometry topography information of the 3D virtual environment avoids the need to voxelate the surrounding environment of the kinematic system. The CFD function provides advantageously a short list of free of collision postures, that make it possible to apply kinematic system performance models or suitability criterion for selecting the best posture for performing a target task from a prescribed location.

Of course, those of skill in the art will recognize that, unless specifically indicated or required by the sequence of operations, certain steps in the processes described above may be omitted, performed concurrently or sequentially, or performed in a different order.

Those skilled in the art will recognize that, for simplicity and clarity, the full structure and operation of all data processing systems suitable for use with the present disclosure is not being illustrated or described herein. Instead, only so much of a data processing system as is unique to the present disclosure or necessary for an understanding of the present disclosure is illustrated and described. The remainder of the construction and operation of data processing system 100 may conform to any of the various current implementations and practices known in the art.

It is important to note that while the disclosure includes a description in the context of a fully functional system, those skilled in the art will appreciate that at least portions of the present disclosure are capable of being distributed in the form of instructions contained within a machine-usable, computer-usable, or computer-readable medium in any of a variety of forms, and that the present disclosure applies equally regardless of the particular type of instruction or signal bearing medium or storage medium utilized to actually carry out the distribution. Examples of machine usable/readable or computer usable/readable mediums include: nonvolatile, hard-coded type mediums such as read only memories (ROMs) or erasable, electrically programmable read only memories (EEPROMs), and user-recordable type mediums such as floppy disks, hard disk drives and compact disk read only memories (CD-ROMs) or digital versatile disks (DVDs).

Although an exemplary embodiment of the present disclosure has been described in detail, those skilled in the art will understand that various changes, substitutions, variations, and improvements disclosed herein may be made without departing from the spirit and scope of the disclosure in its broadest form.

None of the description in the present application should be read as implying that any particular element, step, or function is an essential element which must be included in the claim scope: the scope of patented subject matter is defined only by the allowed claims.

The invention claimed is:

1. A method for predicting, by a data processing system, a collision free posture of a kinematic system surrounded by a surrounding environment, which method comprises the following steps of:
    a) receiving a 3D virtual environment being a 3D representation of the surrounding environment;
    b) receiving a 3D virtual kinematic system being a 3D representation of the kinematic system, and a set of 3D postures defined for the 3D virtual kinematic system;
    c) receiving a target task to be performed by the 3D virtual kinematic system with respect to the 3D virtual environment;
    d) receiving a prescribed location within the 3D virtual environment, the prescribed location defining a position at which the 3D virtual kinematic system has to be placed within the 3D virtual environment;
    e) applying a collision free detection (CFD) function trained by a machine learning algorithm to a set of input data containing the 3D virtual environment, the target task, the prescribed location and the set of 3D postures, wherein the CFD function is configured for generating a set of output data that is a set of collision free postures containing all 3D postures of the set of 3D postures received enabling the 3D virtual kinematic system to perform the target task when disposed at the prescribed location;
    f) selecting at least one of the collision free postures from the set of collision free postures; and
    g) displaying the at least one of the collision free postures, which was selected in step f), of the 3D virtual kinematic system within the 3D virtual environment.

2. The method according to claim 1, which further comprises using the selected collision free posture for controlling a motion of the 3D virtual kinematic system.

3. The method according to claim 1, which further comprises configuring the target task for defining an action to be performed by the 3D virtual kinematic system with respect to the surrounding environment, and that depends on the surrounding environment.

4. The method according to claim 1, wherein the selecting of the at least one collision free posture includes automatically classifying the collision free postures of the set of collision free postures according to at least one predefined criterion.

5. The method according to claim 1, wherein the machine learning algorithm uses a convolutional neural network (CNN).

6. The method according to claim 5, which further comprises applying the CNN to a 2D image that is a 2D representation of the 3D virtual environment, the prescribed location, and the target task.

7. The method according to claim 6, wherein the CFD function trained by the machine learning algorithm is configured for:
    acquiring at least one depth image of the 3D virtual environment from the prescribed location;
    using the at least one depth image, the prescribed location and the target task as inputs to a dimensionality reduction algorithm configured for outputting the 2D image representing or encoding, in a single two-dimensional image, the at least one depth image, the prescribed location and the target task; and
    using the 2D image as an input to the CNN, the CNN being configured for outputting the set of collision free postures containing all the postures of the set of 3D postures that enable the kinematic system to perform the target task when located at the prescribed location.

8. A computer-implemented method for creating a training dataset for training a collision free detection (CFD) function, which comprises the steps of:
    a) receiving a set of 3D virtual environments and for each 3D virtual environment, a prescribed location defined within the 3D virtual environment;
    b) receiving a 3D virtual kinematic system and a set of 3D postures defined for the 3D virtual kinematic system;

c) receiving, for each of the 3D virtual environments, a target task to be performed by the 3D virtual kinematic system with respect to the 3D virtual environment;

d) automatically selecting one of the 3D virtual environments and automatically performing the following steps for a selected 3D virtual environment:

d1) automatically selecting a posture within the set of postures;

d2) automatically performing the following steps for a selected posture:

i) creating a set of data containing an identification of the 3D virtual environment that has been selected, an identification of the prescribed location, an identification of the target task, and an identification of the posture that has been selected;

ii) placing the 3D virtual kinematic system characterized by the selected posture at the prescribed location defined within the selected 3D virtual environment to create a 3D system containing the 3D virtual environment and the 3D virtual kinematic system placed at the prescribed location;

iii) determining whether the 3D virtual kinematic system characterized by the selected posture is able to perform the target task when placed at the prescribed location, and if yes, proceeding with a next step iv), otherwise labeling a created set of data with a label characterized by a first value, storing in a database the label associated to the set of data, then selecting another posture of the set of postures that has not yet been selected if any, and repeating step d2) for a newly selected posture if such a posture exists, otherwise proceeds to step e);

iv) determining whether a collision between the 3D virtual kinematic system characterized by the selected posture and the 3D virtual environment occurs;

v) labeling the created set of data with the label, wherein the label is characterized by the first value if a collision occurs and a second value otherwise, if there is no collision;

vi) storing in the database the label for the created set of data;

vii) selecting another posture of the set of postures that has not yet been selected if any, and repeating step d2 for the newly selected posture, otherwise, if all postures have been selected, proceeding to step e);

e) repeating step d) until all 3D virtual environments of the set of 3D virtual environments have been selected in order to create a training dataset wherein:

as training input data: the 3D virtual environments and their respective said prescribed location and the target task, and the set of 3D postures; and as training output data: a set of labels, wherein each said label is characterized by either the second value or the first value, and wherein each said label is associated or assigned to a set of data containing an identification of the 3D virtual environment, of the prescribed location, of the target task, and of the posture for which the label value has been assigned.

9. A computer-implemented method for providing a trained collision free detection (CFD) function, which comprises the steps of:

a) receiving a training dataset with a first interface, wherein the training dataset having training input data and training output data, wherein the training input data comprises:

a set of 3D virtual environments, and for each 3D virtual environment of the set of 3D virtual environments, a prescribed location and a target task, a set of postures defined for a 3D virtual kinematic system; and wherein the training output data comprises:

a set of labels, wherein each label is characterized by either a second value or a first value, and wherein each said label is associated or assigned to a set of data containing an identification of the 3D virtual environment, of the prescribed location, of the target task, and of the posture for which the label value has been assigned;

b) automatically selecting one of the 3D virtual environments and automatically performing following steps for a selected 3D virtual environment:

b1) acquiring a depth image of the 3D virtual environment from the prescribed location;

b2) using the depth image, the target task, and the prescribed location as inputs to a dimensionality reduction algorithm configured for providing as output a 2D image;

b3) repeating the following steps (i) and (ii) for training a convolutional neural network (CNN) of the CFD function until each posture of the set of postures has been selected once by:

(i) automatically selecting a posture of the set of postures that has not yet been selected; and (ii) training the CNN, wherein the 2D image and the selected posture are used as input training data for the CNN and the label value associated to the set of data containing the identification of the 3D virtual environment, of the prescribed location, of the target task, and of the posture that has been selected is used as output training data;

c) repeating step b) until all 3D virtual environments of the set of 3D virtual environments have been processed; and d) providing the trained CFD function with a second interface.

10. A data processing system, comprising:

a processor; and an accessible memory, the data processing system configured to:

a) receive a 3D virtual environment being a representation of a surrounding environment;

b) receive a 3D representation of a kinematic system, namely a 3D virtual kinematic system, and a set of 3D postures defined for the 3D virtual kinematic system;

c) receive a target task to be performed by the kinematic system with respect to the surrounding environment;

d) receive a prescribed location within the 3D virtual environment, the prescribed location defining a position at which the 3D virtual kinematic system has to be placed within the 3D virtual environment;

e) apply a collision free detection (CFD) function trained by a machine learning algorithm to a set of input data containing the 3D virtual environment, the target task, the prescribed location and the set of postures, wherein the CFD function is configured for generating a set of output data that is a subset of the set of 3D postures containing all 3D postures enabling the kinematic system to perform the target task when located at the prescribed location;

f) select at least one collision free posture from the set of output data; and g) display the at least one collision free posture, which was selected in step f), of the 3D virtual kinematic system within the 3D virtual environment.

11. The data processing system according to claim 10, wherein the machine learning algorithm is configured to use a convolutional neural network (CNN).

12. The data processing system according to claim 11, wherein the data processing system is configured to apply the CNN to a 2D image that is a 2D representation of the 3D virtual environment, the prescribed location, and the target task.

13. The data processing system according to claim 12, wherein the data processing is configured to automatically classify the collision free postures of the set of output data according to at least one predefined criterion.

14. A non-transitory computer-readable medium encoded with executable instructions that, when executed, cause at least one processing system to:

a) receive a 3D representation of a surrounding environment being a 3D virtual environment;

b) receive a 3D representation of the kinematic system being a 3D virtual kinematic system and a set of 3D postures defined for the 3D virtual kinematic system;

c) receive a target task to be performed by the kinematic system with respect to the surrounding environment;

d) receive a prescribed location within the 3D virtual environment, the prescribed location defining a position at which the 3D virtual kinematic system has to be placed within the 3D virtual environment;

e) apply a collision free detection (CFD) function trained by a machine learning algorithm to a set of input data containing the 3D virtual environment, the target task, the prescribed location and the set of postures, wherein the CFD function is configured for generating a set of output data that is a set of collision free postures enabling the kinematic system to perform the target task when located at said prescribed location;

f) select at least one collision free posture from the set of collision free postures; and g) display the at least collision free posture, which was selected in step f), of the 3D virtual kinematic system within the 3D virtual environment.

15. The non-transitory computer-readable medium according to claim 14, wherein the machine learning algorithm uses a convolutional neural network (CNN).

* * * * *